United States Patent
Tsai

(10) Patent No.: US 10,033,309 B2
(45) Date of Patent: Jul. 24, 2018

(54) CONTROL APPARATUS FOR DYNAMICALLY ADJUSTING PHASE SWITCHING OF THE DC MOTOR AND METHOD THEREOF

(71) Applicant: ANPEC ELECTRONICS CORPORATION, Hsinchu (TW)

(72) Inventor: Ming-Jung Tsai, Changhua County (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 15/488,792

(22) Filed: Apr. 17, 2017

(65) Prior Publication Data

US 2017/0222580 A1  Aug. 3, 2017

Related U.S. Application Data

(63) Continuation-in-part of application No. 14/948,194, filed on Nov. 20, 2015.

(30) Foreign Application Priority Data

Jul. 17, 2015  (TW) ............................... 104123226 A

(51) Int. Cl.
| | | |
|---|---|---|
| H03K 5/00 | (2006.01) | |
| H02P 6/15 | (2016.01) | |
| H02P 6/08 | (2016.01) | |
| H02P 6/10 | (2006.01) | |
| H02P 6/04 | (2016.01) | |
| H02P 6/06 | (2006.01) | |

(Continued)

(52) U.S. Cl.
CPC ............... *H02P 6/153* (2016.02); *H02P 6/04* (2013.01); *H02P 6/06* (2013.01); *H02P 6/085* (2013.01); *H02P 6/10* (2013.01); *H02P 6/26* (2016.02); *H02P 27/04* (2013.01)

(58) Field of Classification Search
CPC .... F16H 2061/326; F16H 61/32; H02P 25/08; H02P 25/092; H02P 25/0925
See application file for complete search history.

(56) References Cited

U.S. PATENT DOCUMENTS

| | | | |
|---|---|---|---|
| 6,603,562 B1* | 8/2003 | Ono | .................... G03F 7/70716 |
| | | | 356/399 |
| 2008/0018295 A1* | 1/2008 | Jami | ........................ H02P 6/10 |
| | | | 318/799 |
| 2016/0156295 A1* | 6/2016 | Kaidu | ..................... H02P 6/182 |
| | | | 318/400.11 |

* cited by examiner

*Primary Examiner* — Shawki S Ismail
*Assistant Examiner* — Zoheb Imtiaz
(74) *Attorney, Agent, or Firm* — Li & Cai Intellectual Property (USA) Office

(57) ABSTRACT

Disclosed are a control apparatus for dynamically adjusting a phase switching of a DC motor and a method thereof. A rotor in the DC motor is divided into 2 M pole areas, wherein M is a positive integer not less than 1. The control apparatus comprises a phase detector, a current detector, a control circuit and a driving circuit. The phase detector detects the phase switching state of the pole areas to generate a standard phase signal. The current detector detects a current flowing through the DC motor in one of switching points of the standard phase signal to generate a current detection value. The control circuit periodically outputs 2 M drive signals, and determines to perform dynamically adjusting operation on the timing sequence of the drive signals according to the current detection value. The driving circuit receives the drive signals to perform the phase switching for driving the DC motor.

16 Claims, 7 Drawing Sheets

(51) Int. Cl.
*H02P 6/26* (2016.01)
*H02P 27/04* (2016.01)

CONTROL APPARATUS FOR DYNAMICALLY ADJUSTING PHASE SWITCHING OF THE DC MOTOR AND METHOD THEREOF

CROSS-REFERENCE TO RELATED APPLICATIONS

This Application is a continuation-in-part of Non-provisional application Ser. No. 14/948,194 filed on Nov. 20, 2015, currently pending.

BACKGROUND OF THE INVENTION

1. Field of the Invention

The instant disclosure relates to a control apparatus for switching phases in a DC motor; in particular, to a control apparatus and a control method thereof, which can dynamically adjust the tuning on or off of each switch of driving circuit via detecting the current value of the coil of the DC motor at the timing point when switching phases, so as to reduce the motor vibration noises and to increase the rotation speed or the efficiency.

2. Description of Related Art

In the traditional DC motor, the electrical phase switching is usually implemented by using the semi-conductor switches. Please refer to FIG. 1. FIG. 1 shows a schematic drawing of a driving circuit of a traditional DC motor. The driving circuit 10 is an H-bridge circuit comprising four switches Q1~Q4, which is electrically connected to the DC motor 12 respectively via its two output ends A and B. Moreover, during the operation of the driving circuit 10, there are mainly two different turning phases, wherein a first phase refers to the condition that the switches Q1 and Q4 are turned on, and a second phase refers to the condition that the switches Q2 and Q3 are turned on. Thus, the driving circuit 10 needs to switch phases between these two phases to effectively drive the DC motor 12 to rotate.

Specifically speaking, please refer to FIG. 2. FIG. 2 shows a schematic drawing of a control circuit of a traditional DC motor. The control circuit 20 comprises four output ends AH, BH, AL and BL to respectively provide the switch signals H1, H2, L1 and L2 to control the turning on or off of each switch Q1~Q4 in the driving circuit 10. Thus, at the first phase, the control circuit 20 uses the switch signals H1 and L2 to turn on the switches Q1 and Q4, and uses the switch signals H2 and L1 to turn off the switches Q3 and Q2, which makes the current Im flow from the output end A, through the DC motor 12, and to the output end B. On the other hand, at the second phase, the control circuit 20 uses the switch signals H1 and L2 to turn off the switches Q1 and Q4, and uses the switch signals H2 and L1 to turn on the switches Q3 and Q2, which makes the current Im flow from the output end B, through the DC motor 12, and to the output end A.

However, during the rotation of the DC motor 12, the equivalent motor load of the DC motor 12 can be represented by the coil conductance, the coil resistor and a reaction electromotive force having opposite polarity to the applied voltage. Thus, the current Im flowing through the DC motor 12 must be influenced by the above parameters, and changes correspondingly. Accordingly, during the phase switching, if the current Im cannot be effectively controlled, the current left at the timing point of phase switching would affect the operation of the DC motor 12, which makes the DC motor 12 produce mechanical noise during the rotation.

SUMMARY OF THE INVENTION

The instant disclosure provides a control apparatus for dynamically adjusting phase switching of the DC motor. A rotor of the DC motor is divided into 2 M pole areas for phase switching, wherein M is an integer larger than 1. The control apparatus comprises a phase detector, a current detector, a control circuit and a driving circuit. The phase detector is configured to detect the 2 M pole areas when switching phase, and accordingly generates a standard phase signal. The current detector is configured to detect one coil of the DC motor based on at least one timing point of phase switching in the standard phase signal, and accordingly generates a current detection value. The control circuit is connected to the phase detector and the current detector. The control circuit is configured to periodically and orderly output 2 M driving signal, and to determine whether to adjust the timing sequence of the 2 M driving signals output in the next period according to the currently received current detection value. The driving circuit is connected to the control circuit and the DC motor. The driving circuit is configured to switching phases of the 2 M pole areas of the rotor according to the received 2 M driving signals, so as to drive the DC motor to rotate.

The instant disclosure further provides a control method used in a control apparatus. The control apparatus dynamically adjusts the phase switching of the DC motor. A rotor of the DC motor is divided into 2 M pole areas for phase switching, wherein M is an integer larger than 1. The control apparatus comprises a phase detector, a current detector, a control circuit and driving circuit. The control circuit periodically and orderly outputs 2 M driving signals. The driving circuit switches phases of the 2 M pole areas of the rotor according to the received 2 M driving signals so as to drive the DC motor to rotate. The control method comprising: via the phase detector, detecting the 2 M pole areas when switching phase and accordingly to generate a standard phase signal; via the current detector, detecting one coil of the DC motor based on at least one timing point of phase switching in the standard phase signal, and accordingly generating a current detection value; via the control circuit, determining whether the currently received current detection value is zero for determining whether to adjust the timing sequence of the 2 M driving signals output in the next period; and via the control circuit, adjusting the timing sequence of the 2 M timing sequence outputted in the next period and switching phases of the 2 M pole areas of the rotor according to the adjusted 2 M driving signals if the currently received current detection value is not equal to zero.

To sum up, the control apparatus for dynamically adjusting phase switching of the DC motor and the control method thereof provided by the instant disclosure can dynamically adjust the tuning on or off of each switch of driving circuit via detecting the current value of the coil of the DC motor at the timing point when switching phases, so as to reduce the motor vibration noise and to increase the rotation speed and efficiency.

For further understanding of the instant disclosure, reference is made to the following detailed description illustrating the embodiments and embodiments of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

Figure 1:
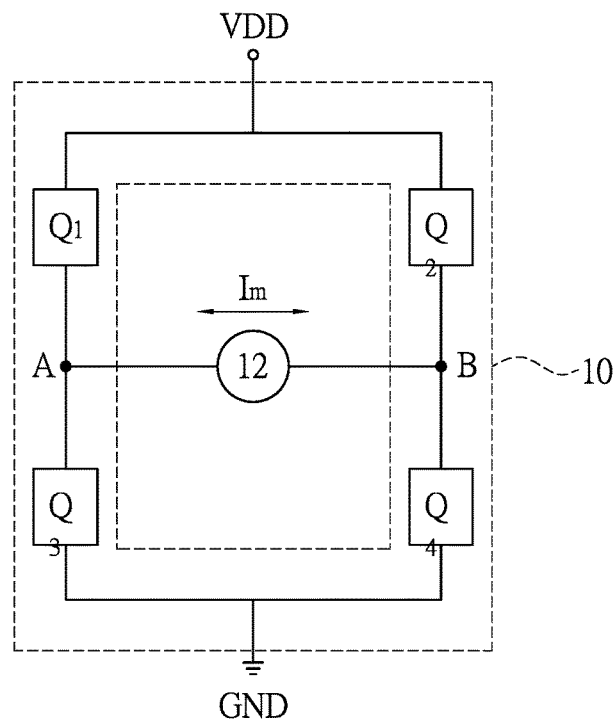
FIG. 1 shows a schematic drawing of a driving circuit of a traditional DC motor.
Figure 2:
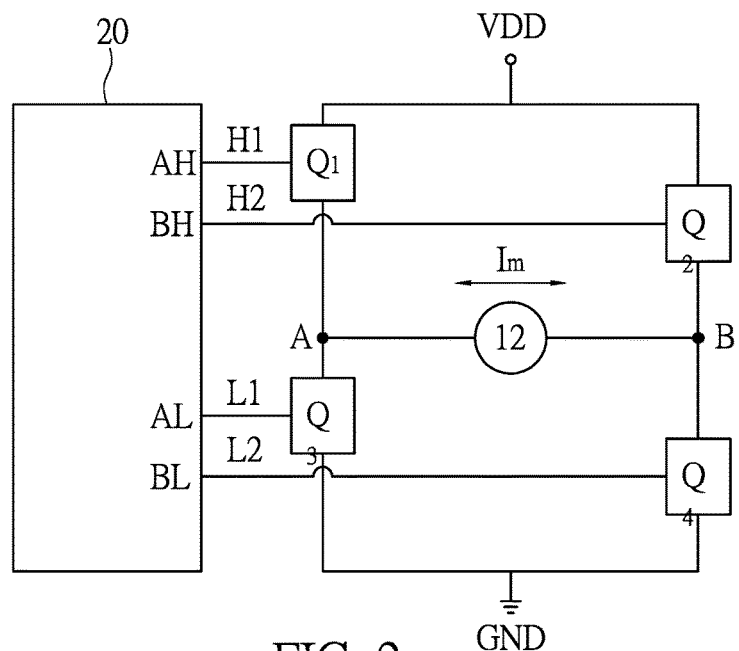
FIG. 2 shows a schematic drawing of a control circuit of a traditional DC motor.

The aforementioned illustrations and following detailed descriptions are exemplary for the purpose of further explaining the scope of the instant disclosure. Other objectives and advantages related to the instant disclosure will be illustrated in the subsequent descriptions and appended drawings. In the drawings, the size and relative sizes of layers and regions may be exaggerated for clarity.

It will be understood that, although the terms first, second, third, and the like, may be used herein to describe various elements, components, regions, layers and/or sections, these elements, components, regions, layers and/or sections should not be limited by these terms. These terms are only to distinguish one element, component, region, layer or section from another region, layer or section discussed below and could be termed a second element, component, region, layer or section without departing from the teachings of the instant disclosure. As used herein, the term "and/or" includes any and all combinations of one or more of the associated listed items.

Figure 3:
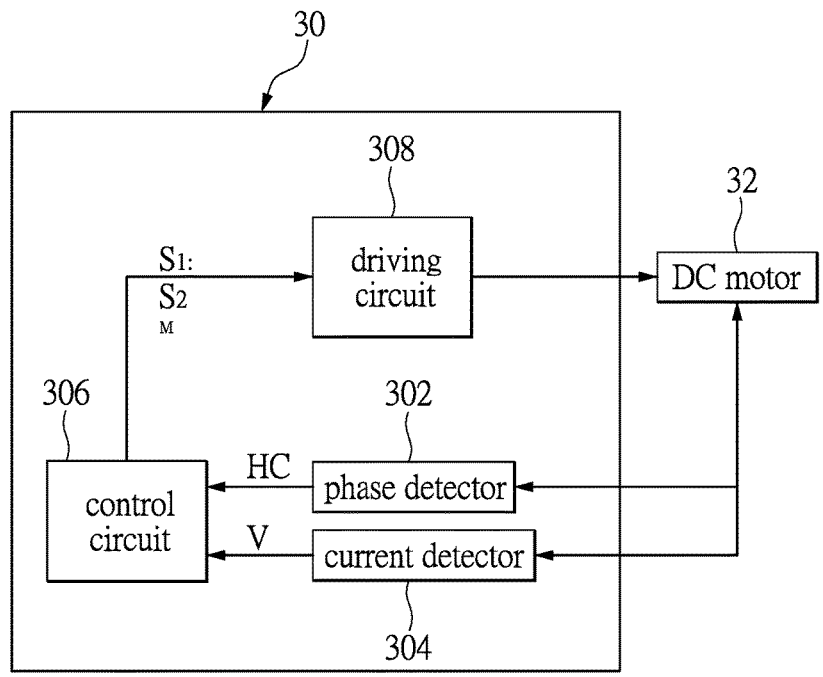
FIG. 3 shows a block diagram of a control apparatus, for dynamically adjusting phase switching of the DC motor, of one embodiment of the instant disclosure.

Please refer to FIG. 3. FIG. 3 shows a block diagram of a control apparatus, for dynamically adjusting phase switching of the DC motor of one embodiment of the instant disclosure. The control apparatus 30 comprises a phase detector 302, a current detector 304, a control circuit 306 and a driving circuit 308. Each element of the control apparatus 30 can be implemented all by hardware circuits, or by the hardware circuit with certain firmware or software. The implementation of the control apparatus 30 is not limited herein. Moreover, the phase detector 302, the current detector 304, the control circuit 306 and the driving circuit 308 can be integrated or separated, and it is not limited herein.

Briefly speaking, in this embodiment, the rotor of the DC motor 32 is divided into 2 M pole areas to switch phases. The phase detector 302 detects the 2 M pole areas during the phase switching, and accordingly generates a standard phase signal HC. The current detector 304 detects the coil of the DC motor 32 based on at least one timing point of phase switching in the standard phase signal, and accordingly generates a current detection value V. The control circuit 306 is connected to the phase detector 302 and the current detector 304, periodically and orderly outputs 2 M driving signals S1~S2M, and determines whether to adjust the timing diagram of the 2 M driving signals S1~S2M output in the next period according to the currently received current detection value V. The driving circuit 308 is connected to the control circuit 306 and the DC motor 32, and switches phases of the 2 M pole areas of the rotor according to the received 2 M driving signals S1~S2M, so as to drive the DC motor 32 to rotate.

The structure of the DC motor 32 should be well-known knowledge in this field of art, so the detailed description related to the DC motor 32 is omitted herein. It should be noted that, the total amount of the pole areas needed in the rotor of the DC motor 32 is not limited herein, so the total amount of the pole areas in the DC motor 32 can be designed by those skilled in the art based on need. In other words, in this embodiment, M can be any positive integer larger than 1. For example, if M=2, the rotor of the DC motor 32 is divided into four pole areas N1, S1, N2 and S2 to switch phases.

The phase detector 302 can be a Hall sensing element, but it is not limited herein. This Hall sensing element is mainly used to detect the position change of each pole area N1, S1, N2 and S2 in the rotor of the DC motor 32, and to accordingly generate a standard phase signal HC. In other words, the rotor of the DC motor 32 is currently switched to the phase N1, S1, N2 or S2 according to the standard phase signal HC. Additionally, the current detector 304 detects the coil of the DC motor 32 based on at least one timing point of phase switching in the standard phase signal, and accordingly generates a current detection value V. Thus, according to the above, those skilled in the art should understand that under the ideal circumstance, the coil at each timing point when switching phase should have a zero current. However, in practice, because of the effects of the coil inductance, the coil resistance and the reaction electrochemical potential, there would be some current left in the coil at each timing point when switching phase, which can easily make the rotor of the DC motor 32 switch phase unsuccessfully and thus mechanical noise would be heard.

From the above, in the control apparatus 30 of this embodiment, the current detector 304 determines whether there is current left at each timing point when switching phase, and records this left current as a current detection value V. The control circuit 306 determines whether to dynamically adjust the turning on or off of each switch in the driving circuit 308 according to this current detection value V. Specifically speaking, in this embodiment, the current detector 304 determines if there is the left current at the coil at a certain timing point when switching phase, the current detector 304 then sends the related current detection value V to inform the control circuit 306 to control each switch of the driving circuit 308 in advance in the next period. Thus, the control apparatus 30 in this embodiment can effectively prevent current from leaving the coil at each timing point when switching phase, which helps the rotor of the DC motor 32 to switch phase successfully and thus avoids the mechanical noise and increases the rotation speed.

According to the above, those skilled in the art should understand that, each driving signal S2M output by the control circuit 306 switches the rotor of the DC motor 32 to its corresponding pole area. For example, if M=2, the rotor of the DC motor 32 is divided into four pole areas N1, S1, N2 and S2. Among the four driving signals S1~S4 output periodically and in order by the control circuit 306, the driving signal S1 switched the rotor of the DC motor 32 to the pole area N1, the driving signal S2 switched the rotor of the DC motor 32 to the pole area N2, and so on.

On the other hand, the driving circuit 308 can be an H-bridge circuit comprising a first switch and a second switch as an upper bridge and a third switch and a fourth switch as a lower bridge, and the switches are connected between the control circuit 306 and the coil of the DC motor 32. The details related to the driving circuit 308 are considered well-known for those skilled in the art, and thus the details related to the driving circuit 308 are omitted. It is worth mentioning that the switches can be the Metal-Oxide-Semiconductor Field-Effect Transistors (MOSFETs), wherein the first switch and the second switch are P-channel MOSFETs (PMOS) and the third switch and the fourth switch are N-channel MOSFETs (NMOS). However, it is not limited herein, and those skilled in the art can design depending on need.

Figure 4:
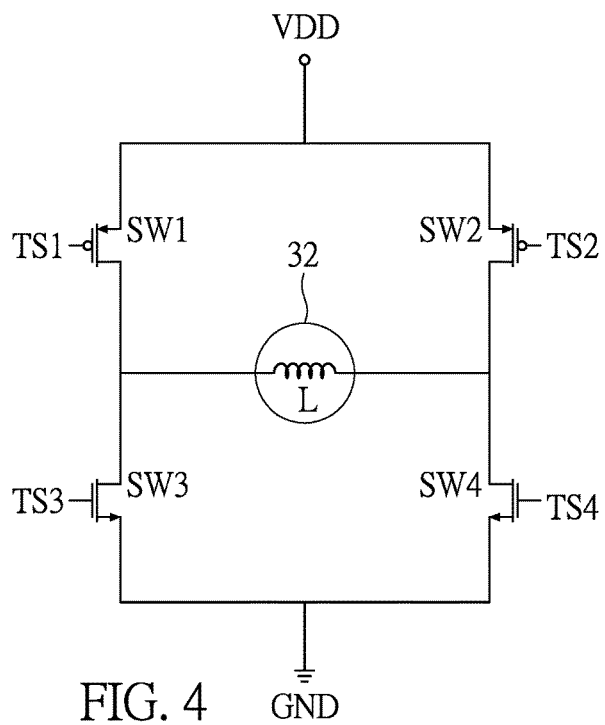
FIG. 4 shows a circuit diagram of a control apparatus, for dynamically adjusting phase switching of the DC motor, of one embodiment of the instant disclosure.

Each of the driving signals S1~S2M output by the control circuit 306 respectively controls the turning on or off of each switch of the driving circuit 308, such that the rotor of the DC motor 32 is switched to a corresponding pole area. Specifically speaking, please also refer to FIG. 4. FIG. 4 shows a circuit diagram of a control apparatus, for dynamically adjusting phase switching of the DC motor, of one embodiment of the instant disclosure. In the upper bridge, the drain of the first switch SW1 and the drain of the second switch SW2 can be together connected to a system voltage VDD, and the gate of the first switch SW1 and the gate of the second switch SW2 can be respectively connected to the control circuit 306. Moreover, in the lower bridge, the drain of the third switch SW3 and the drain of the fourth switch SW4 can be respectively connected to two ends of the coil L of the DC motor 32, the source of the third switch SW3 and the source of the fourth switch SW4 can be together connected to a grounding end GND, and the gate of the third switch SW3 and the gate of the fourth switch SW4 can be respectively connected to the control circuit 306.

In addition, as mentioned above, the driving circuit 308 is mainly divided into two different turning phases, wherein a first phase refers to the turning on of the switches SW1 and SW4, and a second phase refers to the turning on of the switches SW2 and SW3. The driving circuit 308 needs to be switched between these two phases, such that the rotation of the DC motor 32 can be effectively driven. Thus, those skilled in the art should understand that, each of the driving signals S1~S2M output by the control circuit 306 comprises four switch control signals TS1, TS2, TS3 and TS4, and the switch control signals TS1, TS2, TS3 and TS4 respectively control the turning on or off of the first switch Sw1, the second switch SW2, the third switch SW3 and the fourth switch SW4, such that each of the pole areas N1, S1, N2 and S2 of the rotor can be switched.

Figure 5:
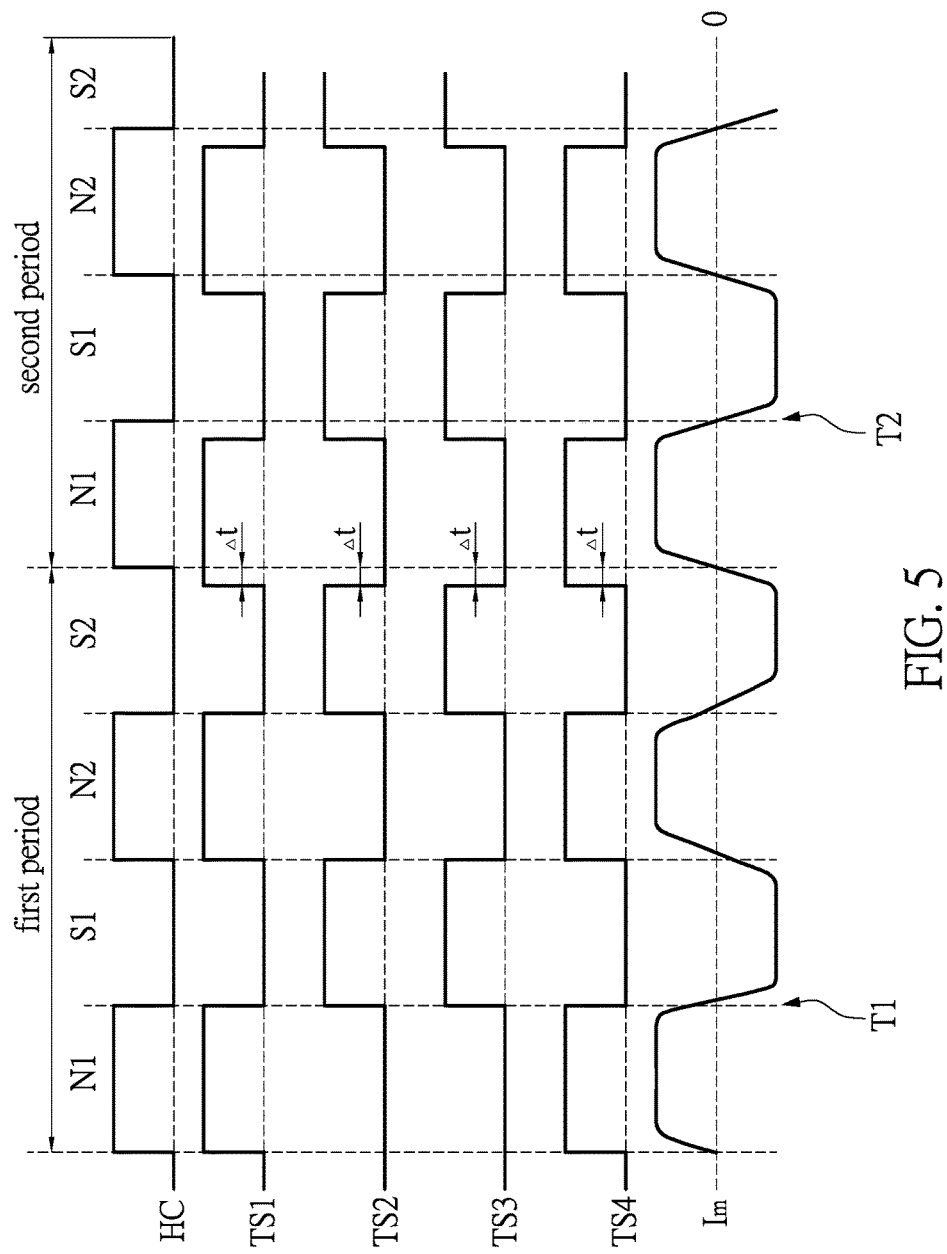
FIG. 5 shows a waveform diagram showing the operation of a control apparatus, for dynamically adjusting phase switching of the DC motor, of one embodiment of the instant disclosure.

On the other hand, in order to further illustrate the implementation of the control apparatus 30, please refer to FIG. 5. FIG. 5 shows a waveform diagram showing the operation of a control apparatus, for dynamically adjusting phase switching of the DC motor, of one embodiment of the instant disclosure. However, the following is but one of the implementations of the operation of the control apparatus 30, and it is not limited herein. Moreover, to simplify the description, similar referred numbers or symbols are indicated to be elements alike in FIGS. 3-5. Also, in the following embodiment, the rotor of the DC motor 32 comprises four pole areas N1, S1, N2 and S2, but it is not limited herein and the skilled in the art can design it depending on needs.

At the beginning when the control apparatus 30 is actuated, the control circuit 306 orderly outputs each of switch control signals TS1~TS4 in each of the driving signals S1~S4 based on each timing point of phase switching in the standard phase signal HC to each of switches SW1~SW4 of the driving circuit 308, so as to respectively control the turning on or off of each switch SW1~SW4. Moreover, as shown in FIG. 5, the current detector 304 detects the current at the coil of the D motor 32 at the timing point T1 of phase switching in the standard phase signal HC. The current detector 304 detects and records the current Im left at the coil as a current detection value V, and outputs it to the control circuit 306.

At the timing point T1 of phase switching, the current Im left at the coil is larger than zero, and thus the current detector 304 records the left current Im as a current detection value V which is a positive value, such as 0.78V. When the control circuit 306 receives this current detection value V, the control circuit 306 determines that there is some current left at the coil at the timing point T1 of phase switching. In other words, the control circuit 306 determines that the phase switching is not successful because the rotor of the DC motor 32 in the first period is affected by the coil inductance, the coil resistance and the reaction electrochemical potential. In order to effectively prevent the situation that there is some current left at the coil at each timing point of phase switching in the first period, the control circuit 306 makes the timing diagram of each switch control signal TS1~TS4 in each of driving signals S1~S4 output in the next period advanced by a unit time. In other words, please again refer to FIG. 5, when it is going to start the second rotation period of the rotor of the DC motor 32, the control circuit 306 makes the output of each switch control signal TS1~TS4 advanced by a unit time Δt.

Those skilled in the art should understand that the major working mechanism in this embodiment is that, the control for the turning on or off of each switch SW1~SW4 in the driving circuit 308 is advanced by a unit time Δt, so as to affect the current Im generated by the coil of the DC motor 32, which prevents the current from leaving at the coil of the DC motor 32 at each timing point when switching phase of each pole area N1, S1, N2 and S2. It is worth mentioning that, those skilled in the art can design how to implement the mechanism of the unit time Δt depending on need, and it is not limited herein. For example, the control apparatus 30 in this embodiment can further comprise a counter, and the counter counts the interval time when the control circuit 306 outputs the driving signals S1~S4 in each duration of pole areas N1, S1, N2 and S2. Thus, if it is necessary to adjust the timing diagram of each driving signal S1~S4 output in the next period, the control circuit 306 makes the output of each driving signal S1~S4 advanced by changing the counting number. However, using a counter to implement the mechanism of the unit time Δt is an example, and it is not limited herein.

On the other hand, at the timing point T2 of phase switching, the current Im left at the coil of the DC motor 32 equals to zero, and thus the current detector 304 records the left current Im as a current detection value V which is zero. When the control circuit 306 receives the current detection value V which is zero, this means that there is no current left at the coil at the timing point T2 of phase switching. In other words, the rotor of the DC motor 32 is not affected by the left current, and thus the control circuit 306 does not need to adjust the timing sequence of each switch control signal TS1~TS4 of each driving signal S1~S4 output in the next period.

It is worth mentioning that, if the current Im left at the coil of the DC motor 32 is still larger than zero at the timing point T2 of phase switching, when it is going to start the third period, the control circuit 306 makes each switch control signal TS1~TS4 advanced by a unit time Δt' and outputs them, wherein Δt' can or cannot equal to Δt, which is designed based on need. In other words, in this embodiment, via detecting the current at the coil at the timing point of phase switching in each period by the control apparatus 30, the timing sequence of each switch control signal TS1~TS4 output in the next period can be adjusted, which can prevent the current from leaving at the coil at the timing point of phase switching, and help the rotor of the DC motor 32 switch phases successfully without the effect brought by the left current. That is, the adjustment times are not limited herein.

In addition, in other embodiments, when the control circuit 306 receives the current detection value V in the first period, the control circuit 306 can adjust the timing sequence of each switch control signal TS1~TS4 till in the $K^{th}$ period, wherein K can be any positive integer larger than one. However, it is not limited herein, that is, the adjustment does not need to always be made in the next period.

In other embodiments, there might be other circumstance that the current Im left at the coil of the DC motor 32 is smaller than zero at the timing point of phase switching. In this case, the current detector 304 records the current detection value V as a negative value, such as −0.63. Likewise, when the control circuit 306 receives the current detection value V which is negative, the control circuit 306 can delay the timing sequence of each switch control signal TS1~TS4 in the next period by a unit time and output them, such that the current of the coil of the DC motor 32 at each timing point of phase switching can be adjusted to approach zero.

Figure 6:
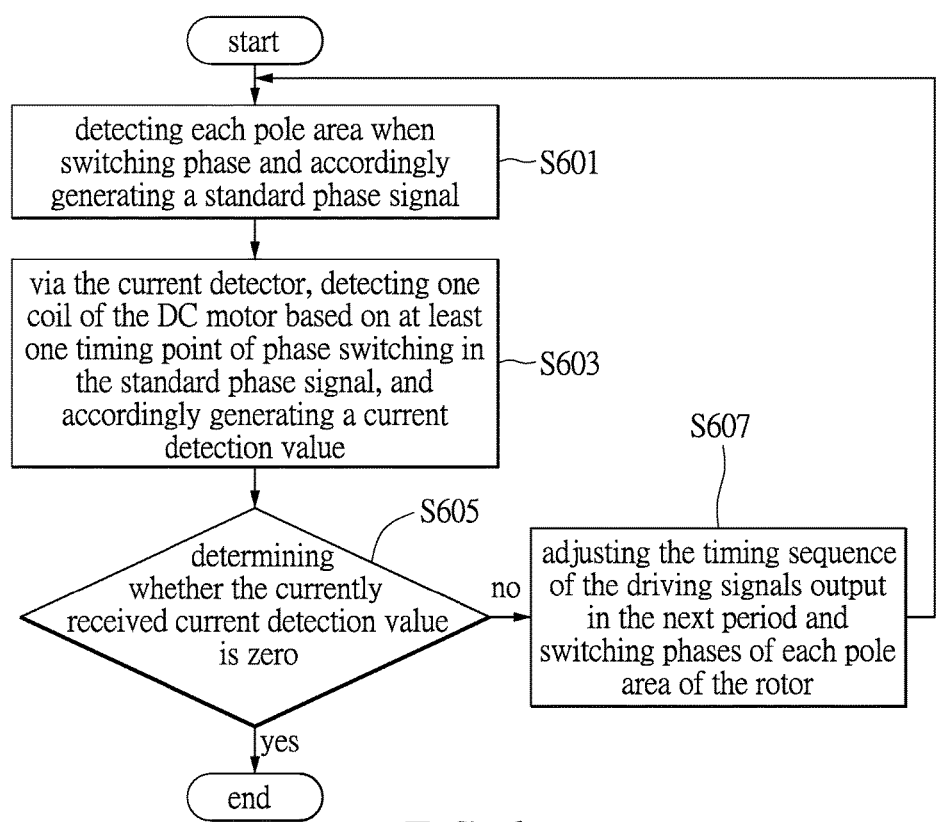
FIG. 6 shows a flow chart of a control method, for dynamically adjusting phase switching of the DC motor, of one embodiment of the instant disclosure.

In order to further illustrate the operation of the control apparatus, in this embodiment, a control method is provided. Please refer to FIG. 6. FIG. 6 shows a flow chart of a control method, for dynamically adjusting phase switching of the DC motor, of one embodiment of the instant disclosure. The method in this embodiment may be conducted in the control apparatus 30 shown in FIG. 3, and thus please refer to FIG. 3 for further understanding.

At the beginning, in step S601, the phase detector detects the 2 M pole areas when switching phase, and accordingly generates a standard phase signal. In step S603, the current detector detects one coil of the DC motor based on at least one timing point of phase switching in the standard phase signal, and accordingly generates a current detection value. After that, in step S605, the control circuit determines whether the currently received current detection value is zero for determining whether to adjust the timing sequence of the 2 M driving signals output in the next period. Finally, in step S607, the control circuit adjusts the timing sequence of the 2 M timing sequence outputted in the next period and switching phases of the 2 M pole areas of the rotor according to the adjusted 2 M driving signals, if the currently received current detection value is not equal to zero, and after that, it returns to step S601.

Specifically speaking, if the current left at the coil at the timing point of phase switching is larger than zero, the current records the current detection value as a positive value. When the control circuit receives the current detection value which is positive, the control circuit makes the timing sequence of each switch control signal in the next period advanced by a unit time and outputs them. Moreover, if the current left at the coil at the timing point of phase switching is less than zero, the current records the current detection value as a negative value. When the control circuit receives the current detection value which is negative, the control circuit makes the timing sequence of each switch control signal in the next period delayed by a unit time and outputs them.

Finally, if the current left at the coil at the timing point of phase switching apparently equals to zero, the current records the current detection value as zero. When the control circuit receives the current detection value which is zero, it means that there would be no current left at the coil at the timing point of phase switching. Therefore, the control circuit does not need to adjust the timing sequence of each switch control signal output in the next period.

Figure 7:
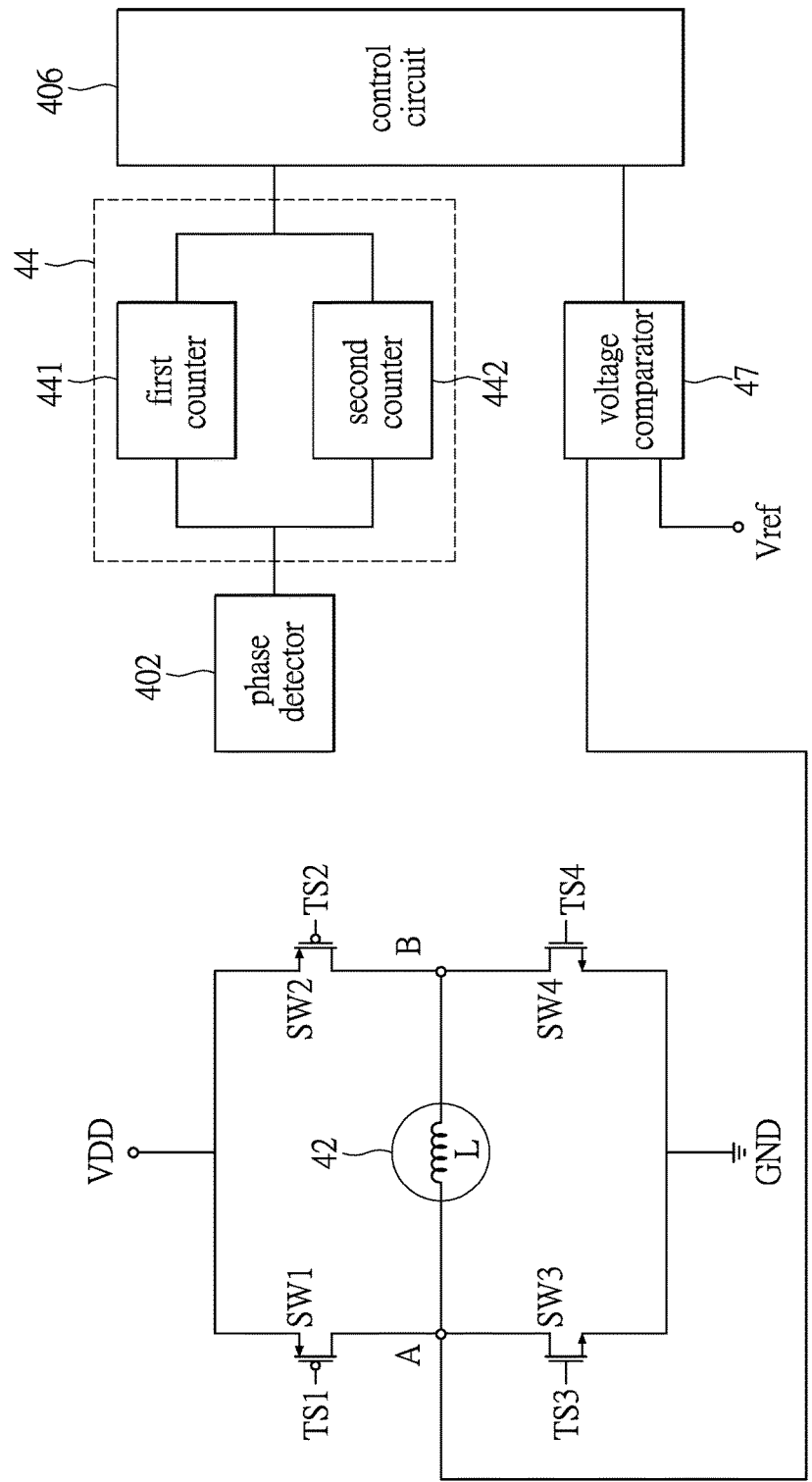
FIG. 7 shows a schematic drawing of a control apparatus of one embodiment of the instant disclosure
Figure 9:
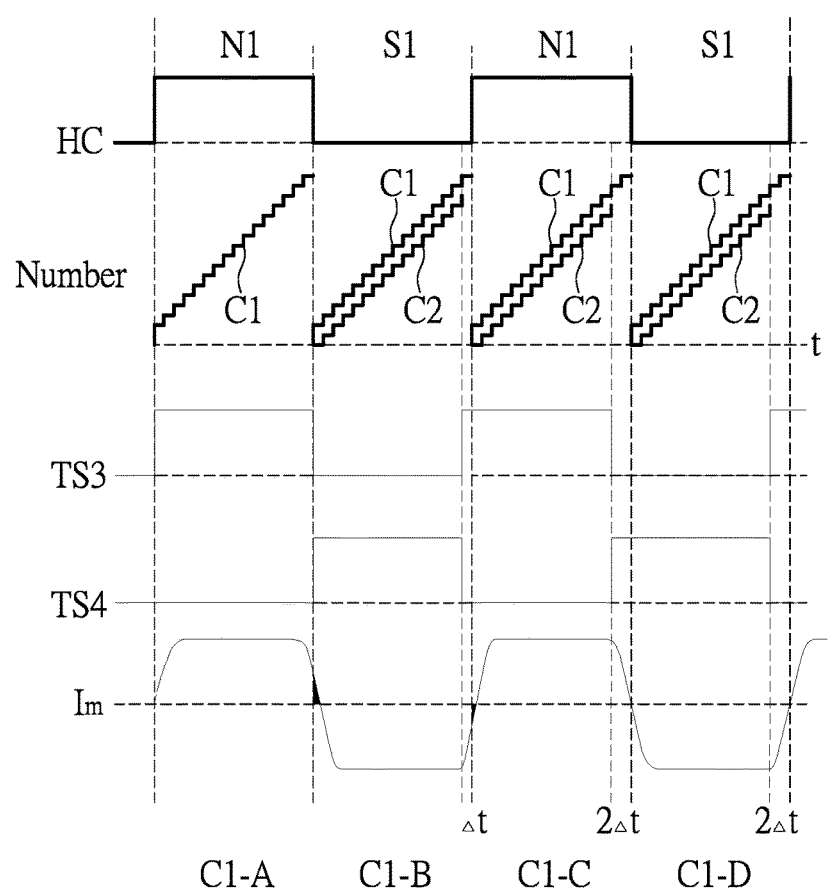
FIG. 9 shows a waveform diagram showing the operation of a control apparatus, for dynamically adjusting phase switching of the DC motor, of one embodiment of the instant disclosure.

Referring to FIG. 7 and FIG. 9, the control apparatus 40 further includes a counter module 44 and a voltage comparator 47. The counter module 44 is electrically connected to the phase detector 402 and the control circuit 406. The voltage comparator 47 is electrically connected to the control circuit 406. The counter module 44 includes a first counter 441 and a second counter 442. Both of the first counter 441 and the second counter 442 receive the phase signals from the phase detector 402. The phase detector 402 is configured to detect the 2 M pole areas when switching phase, and accordingly generates a standard phase signal. In FIG. 9, a first area C1-A, a second area C1-B, a third C1-C, and a fourth C1-D. The number counting by the first counter 441 of the four areas C1-A, C1-B, C1-C, C1-D are the same. In addition, the time interval of the four areas C1-A, C1-B, C1-C, C1-D are also the same.

The first counter 441 counts the interval time as a reference counting number. The second counter 442 counts the interval time when the control circuit 406 outputs the driving signals S1~S4 in each duration of pole areas. Thus, if it is necessary to adjust the timing diagram of each driving signal S1~S4 output in the next period, the control circuit 306 makes the output of each driving signal S1~S4 advanced by changing the counting number. In the embodiment, the counting number C1 of the first counter is 512, but it is not limited thereto. In the other embodiment, the counting number C1 of the first counter 441 can be 1024 or 2048. In other words, the counting number of the first counter 441 can be variable according to the specific needs.

In the embodiment, the node A is electrically connected to the voltage comparator 47. The voltage comparator 47 compares the voltage of the node A with a reference voltage Vref. In the embodiment, the reference voltage Vref includes 0V or other voltage, such as 0V, 10 mV or 30 mV, but it is not limited thereto. The control circuit 402 determines whether the current flowing through the Motor 42 is left according to the comparing result of the voltage of node A and the reference voltage Vref. In the embodiment, the voltage of the node A is a voltage cross the turn-on resister of the switch SW3. In the embodiment, the counting number of the first counter 441 is used as a reference interval time. In the first period, when the counting number C1 of the first counter is 512, voltage comparator 47 determines whether the voltage of the node A is larger than 0V. When the voltage of the node A is larger than 0V, one unit time Δt is decreased in the timing diagram of each driving signal S1~S4 output in the next period, namely, the control circuit 406 makes the output of each driving signal TS3~TS4 advanced by changing the counting number C2 of the second counter from 512 to 511. In the embodiment, the first counter 441 is still used for counting the interval time as a reference number, and second counter 442 is used for counting the adjusted period (ex: the counting number C2 is 511). When the counting number C2 of the second counter 442 is 511 in the next period, the voltage comparator 47 determines whether the voltage of the node A is larger than 0V once again. When the voltage of the node A is larger than 0V at which the counting number C2 is 511, one unit time $\Delta t$ is decreased in the timing diagram of each driving signal TS3~TS4 output in the next period, namely, the control circuit 406 makes the output of each driving signal TS3~TS4 advanced by changing the counting number C2 from 511 to 510. When the voltage of the node A is less than 0V at which the counting number C2 is 510, one unit time $\Delta t$ is increased in the timing diagram of each driving signal S1~S4 output in the next period, namely, the control circuit 406 makes the output of each driving signal TS3~TS4 advanced by changing the counting number from 510 to 511. In the embodiment, the counting number of the second counter can be stored in a storage module (not shown), and being used for next period. When the voltage of the node A is equal to 0V at which the counting number C2 is 510, the counting number C2 in the next period will be maintained as 510 as shown the fourth area C1-D.

In the embodiment, one unit time $\Delta t$ is the time interval of the area C1-A, C1-B, C1-C, C1-D divided by the number counted by the first counter 441. When the number counted by the first counter 441 is changed, the unit time $\Delta t$ is changed, accordingly. For example, the number counted by the first counter 441 is 512, the unit time $\Delta t$ is the time interval of the first area C1-A divided by 512.

Figure 8:
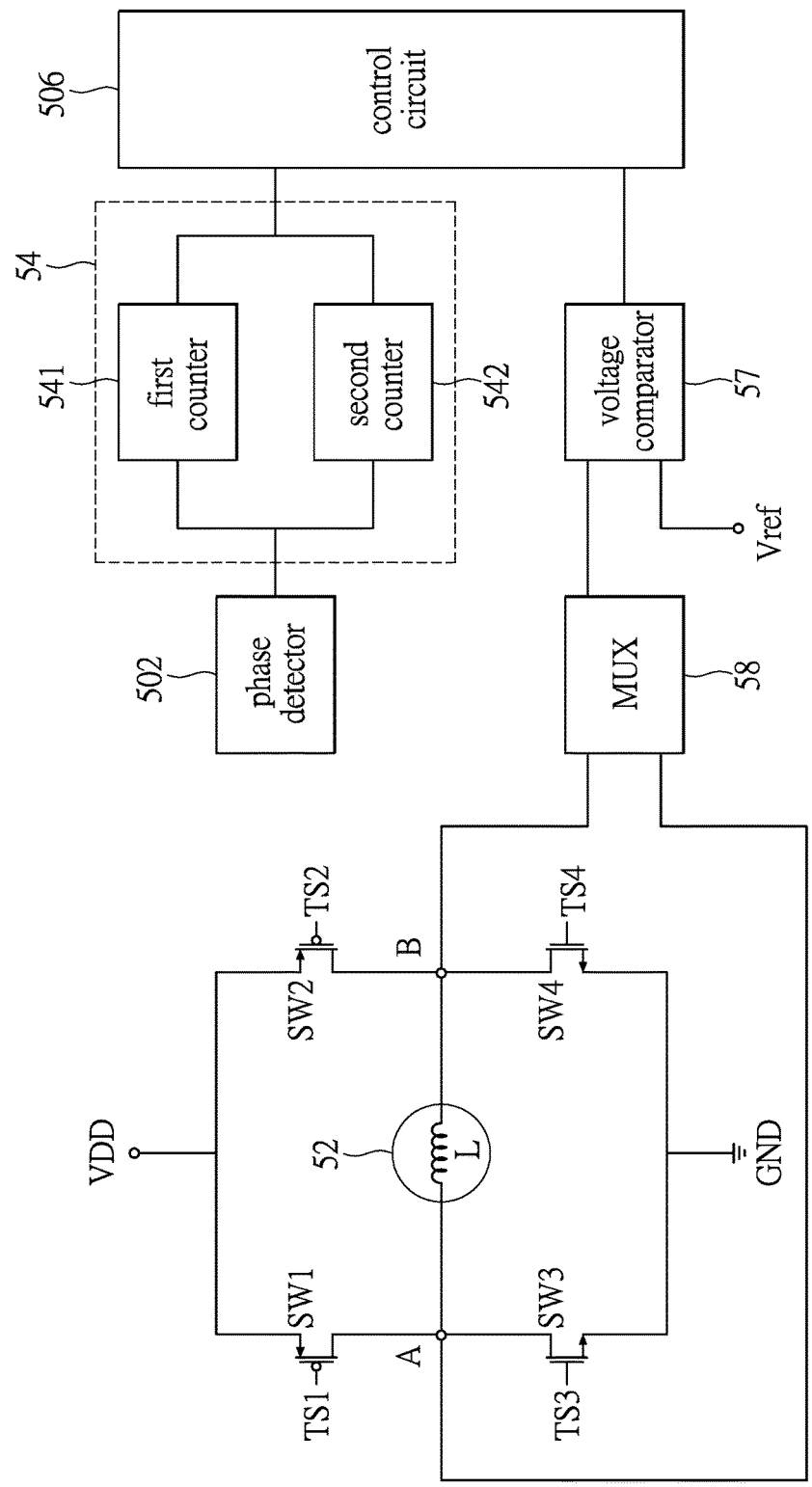
FIG. 8 shows a schematic drawing of a control apparatus of another embodiment of the instant disclosure

Referring to FIG. 8, the control apparatus 50 is similar to the control apparatus 40, but deferring in that the control apparatus 50 further includes a multiplexer 58 to connect the node A and the node B. Namely, the control voltage comparator 57 can detect the bidirectional currents flowing through the motor 52 according to the voltage of the node A and the voltage of the node B. In the embodiment, the multiplexer 58 is used for providing the voltage of the node A or the voltage of the node B to the voltage comparator 57. In the embodiment, the voltage of the node A and the voltage of the node B are symbolized as different phase currents. Therefore, in the embodiment, the control circuit 506 can determine whether one of the two directional currents flowing through the DC motor 52 is left. Therefore, the control method provided in this embodiment can determine whether to dynamically adjust the timing sequence of each switch control signal output in the next period based on the current detection at the coil at each timing point of phase switching. After that the current at the coil at the timing point of phase switching is adjusted to be zero, so as to prevent the left current from making the DC motor switch phases unsuccessfully.

To sum up, the control apparatus for dynamically adjusting phase switching of the DC motor and the control method thereof provided by the instant disclosure can dynamically adjust the turning on or off of each switch of driving circuit via detecting the current value of the coil of the DC motor at the timing point when switching phases, so as to reduce the motor vibration noise and to increase the rotation speed and efficiency. In addition, the control apparatus in the present disclosure can dynamically adjust the turning on or off of each switch of driving circuit via detecting the voltage cross one of the switches at the timing point when switching phases, so as to reduce the motor vibration noises and to increase the rotation speed or the efficiency. Moreover, the reference voltage of voltage comparator in the control apparatus can be variable according to the request for speeding-up or speeding-down of the motor, when the positions of the hall sensors in the motor can not be adjusted, such that the efficiency and the vibration of the motor can be modulated.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A control apparatus for dynamically adjusting phase switching of the DC motor, wherein a rotor of the DC motor is divided into 2 M pole areas for phase switching, and M is an integer larger than 1, the control apparatus comprising:
   a phase detector, configured to detect the 2 M pole areas when switching phase, and accordingly to generate a standard phase signal;
   a counter module, electrically connected to the phase detector, wherein the counter module comprises a first counter and a second counter, wherein a counting number of the first counter is used for a reference of one period;
   a control circuit, connected to the phase detector and the voltage comparator and configured to periodically and orderly output 2 M driving signal;
   a driving circuit, connected to the control circuit and the DC motor, configured to switching phases of the 2 M pole areas of the rotor according to the received 2 M driving signals, so as to drive the DC motor to rotate; and
   a voltage comparator, electrically connected to the driving circuit and detecting a voltage of the driving circuit based on at least one timing point of phase switching in the standard phase signal, the voltage comparator comparing the voltage of the driving circuit and a reference voltage and outputting a comparing result to the control circuit;
   wherein the control circuit determines whether to adjust the timing sequence of the 2 M driving signals output in the next period according to a counting number of the second counter and a comparing result of the voltage comparator.

2. The control apparatus according to claim 1, wherein the driving circuit is an H-bridge circuit comprising four switches, and the switches are connected between the control circuit and the coil.

3. The control apparatus according to claim 2, wherein each of the driving signals has four switch control signals, and each of the switch control signals controls the turning on or off of each switch so that the 2 M pole areas of the rotor switch phases.

4. The control apparatus according to claim 3, wherein the timing sequence of each switch control signal in the driving signals output in the next period is advanced by a unit time via the control circuit, if the voltage of the driving circuit is larger than the reference voltage.

5. The control apparatus according to claim 3, wherein the timing sequence of each switch control signal in the driving signals output in the next period is delayed by a unit time via the control circuit, if the voltage of the driving circuit is smaller than the reference voltage.

6. The control apparatus according to claim 3, wherein the control circuit does not adjust the timing sequence of each switch control signal in the driving signals output in the next period, if the voltage of the driving circuit equals to the reference voltage.

7. The control apparatus according to claim 4, wherein the reference voltage is zero.

8. The control apparatus according to claim 1, wherein the counting number of the second counter is adjusted according to the comparing result of the voltage comparator.

9. A control method, used in a control apparatus, the control apparatus dynamically adjusting the phase switching of the DC motor, wherein a rotor of the DC motor is divided into 2 M pole areas for phase switching, and M is an integer larger than 1, the control apparatus comprising a phase detector, a voltage comparator, a counter module, a control circuit and driving circuit, the control circuit periodically and orderly outputting 2 M driving signals, the driving circuit switching phases of the 2 M pole areas of the rotor according to the received 2 M driving signals so as to drive the DC motor to rotate, the counter module including a first counter and a second counter, a counting number of the first counter used for a reference of one period, and the control method comprising:
via the phase detector, detecting the 2 M pole areas when switching phase and accordingly to generate a standard phase signal;
via the voltage comparator, detecting at least one voltage of the driving circuit and comparing the at least one voltage of the driving circuit with a reference voltage to output a comparing result;
via the control circuit, determining whether to adjust the timing sequence of the 2 M driving signals output in the next period according to a counting number of the second counter and a comparing result of the voltage comparator; and
via the control circuit, adjusting the timing sequence of the 2 M timing sequence outputted in the next period and switching phases of the 2 M pole areas of the rotor according to the adjusted 2 M driving signals if the currently received current detection value is not equal to zero.

10. The control method according to claim 9, wherein the driving circuit is an H-bridge circuit comprising four switches, and the switches are connected between the control circuit and the coil.

11. The control method according to claim 9, wherein each of the driving signals has four switch control signals, and each of the switch control signals controls the turning on or off of each switch so that the 2 M pole areas of the rotor switch phases.

12. The control method according to claim 9, wherein the timing sequence of each switch control signal in the driving signals output in the next period is advanced by a unit time via the control circuit, if the voltage of the driving circuit is larger than the reference voltage.

13. The control method according to claim 9, wherein the timing sequence of each switch control signal in the driving signals output in the next period is delayed by a unit time via the control circuit, if the voltage of the driving circuit is smaller than the reference voltage.

14. The control method according to claim 9, wherein the control circuit does not adjust the timing sequence of each switch control signal in the driving signals output in the next period, if the voltage of the driving circuit equals to the reference voltage.

15. The control method according to claim 9, wherein the reference voltage is zero.

16. The control method according to claim 9, wherein the counting number of the second counter is adjusted according to the comparing result of the voltage comparator.

* * * * *